(12) United States Patent
Eberlein (10) Patent No.: US 9,672,140 B1
(45) Date of Patent: Jun. 6, 2017

(54) PROCESSING SPECIAL REQUESTS AT DEDICATED APPLICATION CONTAINERS

(71) Applicant: SAP SE, Walldorf (DE)

(72) Inventor: Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/979,523

(22) Filed: Dec. 28, 2015

(51) Int. Cl.
*G06F 9/445* (2006.01)
*G06F 11/36* (2006.01)

(52) U.S. Cl.
CPC ............ *G06F 11/3664* (2013.01); *G06F 8/67* (2013.01); *G06F 11/3696* (2013.01)

(58) Field of Classification Search
None
See application file for complete search history.

(56) References Cited

U.S. PATENT DOCUMENTS

| | | | | |
|---|---|---|---|---|
| 8,782,637 B2 * | 7/2014 | Khalid | ................ | G06F 8/61 718/1 |
| 8,984,162 B1 * | 3/2015 | Allen | ................ | G06F 13/385 709/242 |
| 2006/0159077 A1 * | 7/2006 | Vanecek, Jr. | ............. | G06F 8/30 370/360 |
| 2011/0072431 A1 * | 3/2011 | Cable | ................ | G06F 9/5077 718/1 |
| 2011/0197197 A1 * | 8/2011 | Ni | ................ | G06F 9/547 718/104 |
| 2013/0124807 A1 * | 5/2013 | Nielsen | ............. | G06F 11/1438 711/162 |
| 2013/0160105 A1 * | 6/2013 | Huang | ................ | G06F 21/41 726/8 |
| 2016/0112497 A1 * | 4/2016 | Koushik | ............. | H04L 67/10 726/7 |

* cited by examiner

*Primary Examiner* — Daxin Wu (57) ABSTRACT

Various embodiments of systems and methods to provide processing of special requests at dedicated application containers are described herein. In one aspect, an application instance is downloaded and deployed in an application runtime, at a dedicated application container, to process service requests. In another aspect, the dedicated application container starts a proxy process, independently from the application runtime to intercept incoming service requests. The regular service requests are passed by the proxy process to the application runtime for processing by the executing application instance. In yet another aspect, the proxy process executes special service requests directly to access the dedicated container landscape.

20 Claims, 4 Drawing Sheets

PROCESSING SPECIAL REQUESTS AT DEDICATED APPLICATION CONTAINERS

BACKGROUND

Typically, Platform-as-a-Service (PaaS) products are optimized for productive use (such as Cloud Foundry originally developed by VMWare, Inc. company). This guarantees efficient lifecycle management, stable performance, scalability, robust security mechanism, etc. However, such optimization does not provide similar support in development scenarios. In such environments, the implementation of even a small change, e.g., even a single line of code, requires a full deployment process of the application including the change. The full deployment process requires reading, e.g., from the file system, and reinstallation of every application component, even the components without changes; wiring the different modules; resolving dependencies; etc. This significantly slows down the development of new functionalities. Testing of any changes in an application would be possible only after completion of the full application deployment process, which is inefficient from development's perspective.

Providing a platform for web based integrated development environment (WebIDE) that overcomes the above shortcomings is a real challenge. On one hand, cloud-based applications are typically deployed in corresponding dedicated containers, using the containers' file systems that are not accessible outside the containers. Thus, it is not possible to change a particular file, and hence, the deployment of a change, even to a single file, involves packaging and deployment of the complete set of application artifacts. Another limitation is that there is only one network endpoint available for accessing an application at its dedicated container. The single endpoint guarantees that the requests routed to the container will be processed by the application. However, it means that no other functionality or application deployed in the same container, e.g., for efficient deployment purposes, would be accessible. The inefficiency in development of cloud-based applications could be solved for a particular runtime environment by a proprietary, built-in solution, but this solution would not be applicable for other runtimes. For example, a built-in solution for a Java® based runtime environment will not solve the inefficient deployment for applications deployed in containers on runtime environments based on different technologies. e.g., Node.js®, Ruby®, etc.

BRIEF DESCRIPTION OF THE DRAWINGS

The claims set forth the scope with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for processing special requests at dedicated application containers are described herein. In the following description, numerous specific details are set forth to provide a thorough understanding of the embodiments. One skilled in the relevant art will recognize, however, that the presented ideas can be practiced without one or more of the specific details, or with other methods, components, materials, etc. In other instances, well-known structures, materials, or operations are not shown or described in detail to avoid obscuring.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Ideally, a development environment has to provide rapid deployment cycles to gain acceptance by developers. If changing a line of code requires the execution of a full deployment process that may take significant time, e.g., around a minute, before the change can be tested, the developers will look for alternative and more efficient solutions. Therefore, for the purpose of efficient development, the deployment process could be accomplished only once initially, and the subsequent changes are directly applied to the deployed application, according to one embodiment. Furthermore, the proposed solution overcomes the limitations mentioned above in the background section by leveraging the single end point to provide direct access to container's file system, independent from the runtime technology.

Figure 1:
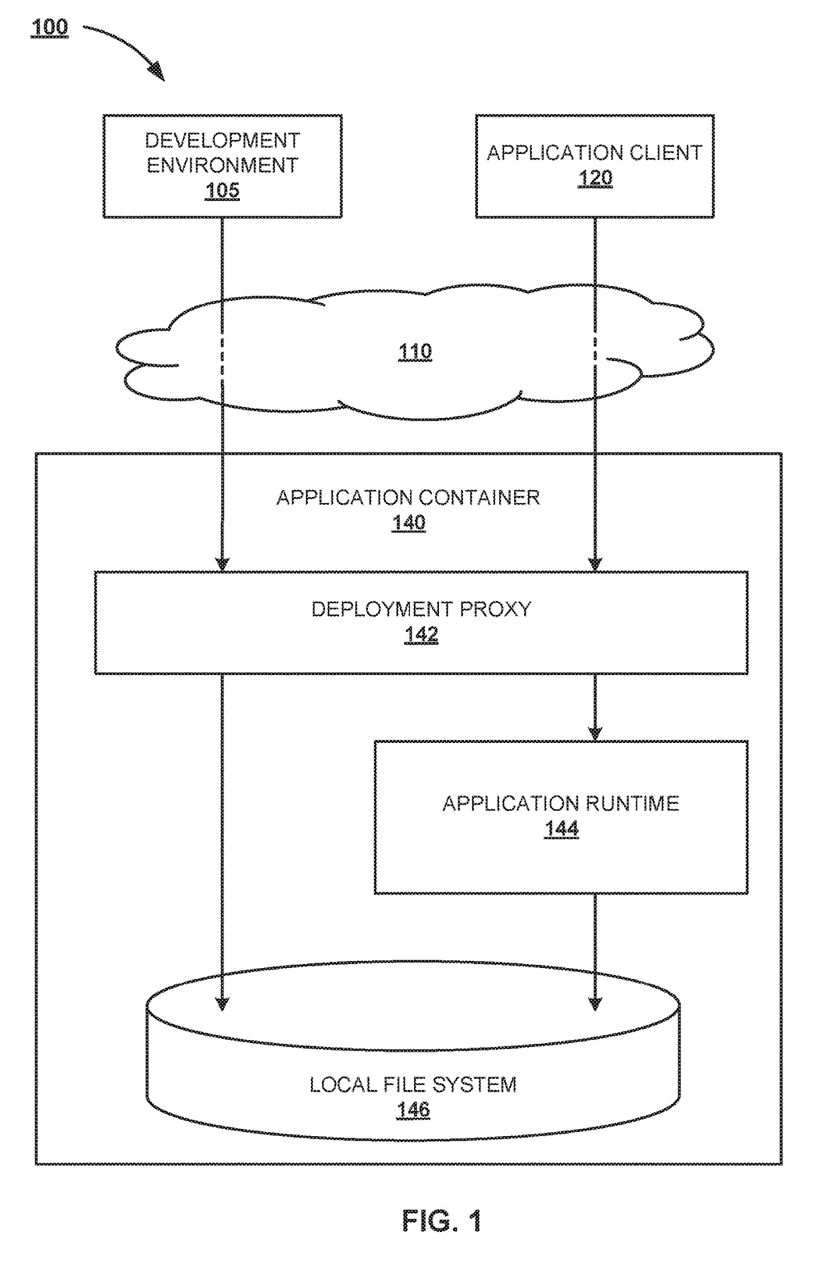
FIG. 1 is a block diagram illustrating computing landscape for hot deployment to cloud-based containers, according to one embodiment.

In one embodiment, when a customer application is deployed to a cloud platform, e.g., Cloud Foundry, an image of the application is created and stored at the cloud platform. This image is deployed to a dedicated container to execute an instance of the application. Thus, for example, when more than one instances of the application are required, a corresponding number of containers are generated to deploy and host the application instances at the cloud platform. FIG. 1 illustrates simplified example computing landscape 100 implementing the mechanism for hot deployment to cloud-based containers, according to one embodiment. Thus, landscape 100 shows only one application container 140 where a single application instance (not illustrated) is deployed and executed. The deployment package (e.g., image) of the application may be stored in file system 146 of the container 140. Runtime 144 is instantiated at the container 140 to deploy and host the application. When deployed, the application is accessible at the container 140 through a single end point only.

Typically, single end point (e.g., Uniform Resource Locator (URL) and port number) means that a container is accessible through only one host name that could be used for routing. For example, one application may have just one host name, and regardless what communication is sent to this host name, it is received by that application. Therefore, even if a second application is deployed in the same container, since a different host name cannot be assigned to the second application, this application will not be accessible at the container. The listening and routing of incoming communication at a cloud-based container are usually handled on infrastructure level, which limits the options for alterations. In landscape 100, this limitation is overcome by instantiating deployment proxy 142 in container 140 as a separate service or process, to intercept the received communication.

As a separate process in the container 140, the deployment proxy 142 is independent from the type of the application runtime 144. Thus, the presented solution for hot deployment to cloud-based containers is not restricted by the technology upon which the deployed application is built. Customers may even bring proprietary runtime services to enhance the list of supported application software technologies. However, further optimization of the hot deployment is possible by embedding at least some of the deployment proxy into some preferred types of application runtimes.

In one embodiment, all incoming user requests are routed to the deployment proxy 142 instead to application runtime 144. The deployment proxy 142 may forward the regular application requests (e.g., service requests) to the application runtime 144 for execution. However, special requests, such as the requests for hot deployment of changes to the application functionality, may be filtered out and processed directly by the deployment proxy 142. As a process running within the container 140, the deployment proxy 142 may access the local file system 146 of the container 140, to directly update the originally deployed application artifacts without re-executing the full deployment cycle.

In this document, regular application requests refer to the productive use of the deployed application. For example, the service requests that could be processed by the deployed application, e.g., at the application runtime 144, could be regarded as regular application requests. The requests sent for testing the deployed application could be regarded as regular application requests, as well. Such requests would be processed by the application at the application runtime 144 as if no deployment proxy (142) was placed into the communication flow. In one embodiment, a number of specific actions may be predefined and filtered out by the deployment proxy 142 for processing separately from the application and even separately from the application runtime 144. The specific actions may be received as special requests at the application container 140. For example, the specific actions may be selected to support hot deployment of various changes to the deployed application. Table 1 provides an exemplary list of specific actions that may be processed separately from the regular application requests, e.g., directly by the deployment proxy 142:

TABLE 1

| Action | Description |
|---|---|
| Deploy file | Adds or updates files directly in cloud-based containers to deploy new or changed development artifacts |
| Undeploy file | Removes files from cloud-based container previously deployed during full deployment or added/altered via hot deployment |
| Set environment variable | Sets environment variables in cloud-based containers (e.g., in instantiated runtimes). As it is common to use environment variables to configure application runtimes, this action enables configuration changes without a full deployment cycle, going beyond development artifact changes |

TABLE 1-continued

| Action | Description |
|---|---|
| Unset environment variable | Unsets environment variables previously set during full deployment or hot deployment |
| Restart application runtime | Restarts application runtimes running inside cloud-based containers. As most application runtimes read their configuration and/or development artifacts only at startup, it is typically required to restart a runtime after a file or environment variable is changed. In order to make this action generic across all supported types of application runtimes, the restart command may be configurable when an application proxy is deployed together with an application runtime to a cloud container. |

As illustrated in FIG. 1, regular application requests may be received by application client 120, and routed to the application container 140, e.g., via public network 110. Application client 120 may be a business user or a client of the customer deploying the application at container 140. The special requests, such as the hot deployment requests, may be received at the application container 140 from deployment environment 105, again via network 110. However, such distribution of regular and special requests between different types of clients is for illustrative purposes only. Other schemes or scenarios are also possible. Furthermore, the special requests may be used for actions that are not related to hot deployment. For example, through special requests a debug session could be instantiated to debug the running application, and even a tunnel could be opened to native debugger.

In one embodiment, the generic deployment proxy running at a container may recognize the special requests based on the path or parameters provided with the URL used by the clients to access the single application end point. For example, the URL may contain text similar to:

'/deployment_proxy/deploy_file/<file name>', where the file could be in appropriate format based on the runtime technology, e.g., eXtensible Markup Language (XML) file, HyperText Transfer Protocol (HTTP) file, JavaScript®, etc. Similarly, other commands could be appended to the request URL, too, such as "write_file", "delete_file", "set" or "unset" an environment variable, "restart" the application or the runtime, etc. One of the advantages of a generic deployment proxy is the ability to execute similar special requests in containers deploying runtimes and applications based on different technologies. Still, some actions may be technology specific, e.g., when restarting a runtimes based on different technologies like Java® server, Node.js, etc.

Figure 2:
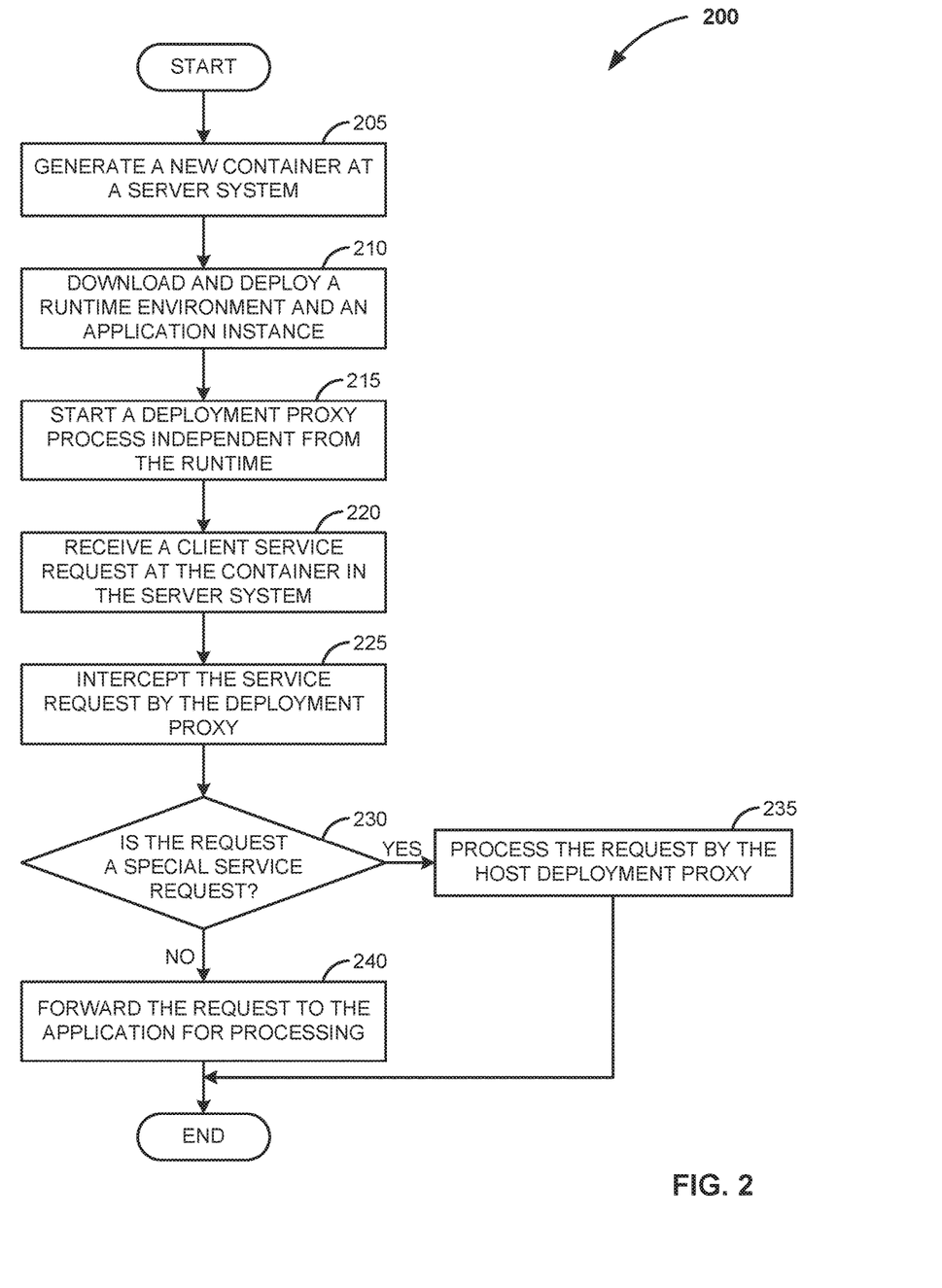
FIG. 2 is a flow diagram illustrating a process to execute special actions at cloud-based containers, according to one embodiment.

FIG. 2 shows process 200 to execute special actions at cloud-based containers, according to one embodiment. As explained, special actions are actions in response to requests that are not processed by the application deployed at a cloud-based container, but are intercepted and executed by a process separate from the application runtime process. Such separate process acts as a proxy and for convenience could be called hot deployment proxy or just deployment proxy. However, there may be special actions not related to deploying changes to the application running at the container.

Process 200 starts at 205 with generating a new container, e.g., at a server system. The container could be a cloud-based container, generated for the deployment of a particular application instance. The server system, and respectively the generated containers could be based on various cloud computing solutions (e.g., the aforementioned Cloud Foundry PaaS). In one embodiment, the application instance may be an instance of a microservice based application, adding functionality to a more complex software product.

At 210, deployable artifacts of the application are downloaded at the container. Deployable artifacts of an appropriate application runtime environment (e.g., Java® server) for the application could be also downloaded, either separately, or packaged together with the artifacts of the application. Further, the application runtime and the application are deployed and instantiated at the container for executing service requests. Process 200 continues at 215 with starting a hot deployment proxy in the container as a separate process. In one embodiment, the deployment proxy may be instantiated based on artifacts stored locally at the container, e.g., in the container's file system. Alternatively, the deployment proxy may be built in to the container infrastructure of the cloud-based computing solution.

At 220, a service request is received at the container in the server system. e.g., from a client system. The service request may be directed to a single endpoint available at the server system for accessing the instantiated container. Typically, running applications at a server system accessible through single endpoints provides different advantages, such as implementing same-origin policy or other security models. However, the disadvantage is that special service requests cannot be easily separated from the regular service requests. Therefore, at 225, the received service request is intercepted by the deployment proxy instead of directly passing it to the application runtime for processing.

At 230, a check is performed, e.g., by the deployment proxy, to verify whether the service request is a regular application request or a special request. If the service request is a special service request, it is processed separately from the application instance at the application runtime. In one embodiment, the special request is executed by the deployment proxy, at 235. Respectively, when the request is not a special service request, it is forwarded to the application runtime for processing by the running application instance, at 240.

In one embodiment, process 200 may be implemented in an environment similar to the landscape 100 illustrated in FIG. 1. It could be mentioned, however, that the described techniques for hot deployment may not be restricted only to cloud computing solutions. For example, different software vendors provide applications platforms based on technologies or architectures developed for cloud solutions, but intended for on-premise implementations. Thus, an application developed for cloud-based application services could be installed on-premise as well, and respectively marketed both as a service and as a product. SAP HANA XS® advanced (SAP® HANA®) extended application services, advanced model) provided by SAP SE company is just one example for such a platform, where applications could be deployed in dedicated containers.

Figure 3:
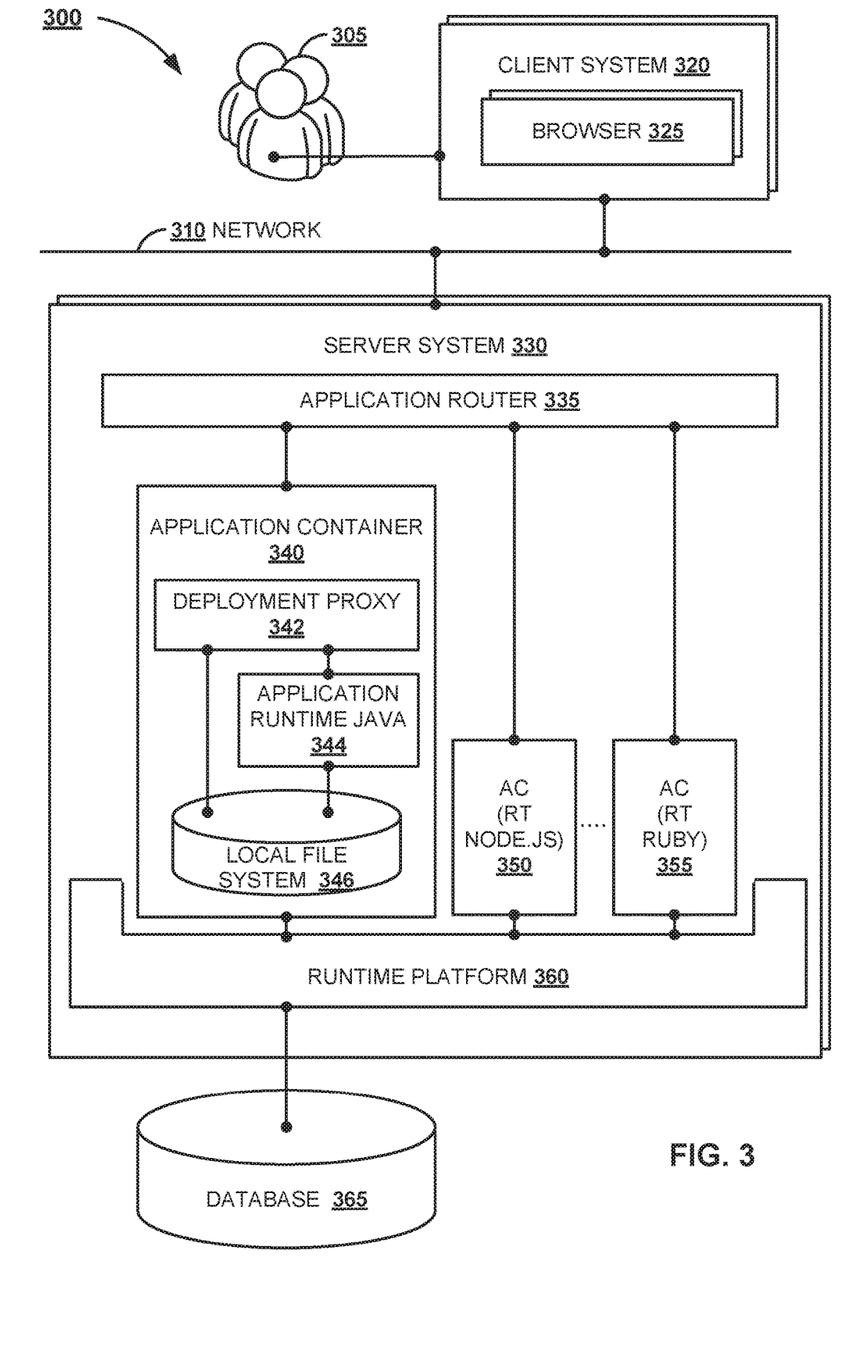
FIG. 3 is a block diagram illustrating a computing landscape to process special requests at dedicated application containers, according to one embodiment.

FIG. 3 illustrates computing landscape 300 implementing techniques to process special requests at dedicated application containers, according to one embodiment. Computing landscape 300 represents a simplified example based on a solution provided by SAP SE company. However, similar functionality may be achieved by alternative solutions provided by other vendors, and structured differently, e.g., using different modules. An advantage of the presented system landscape is the provisioning runtime platform that could be implemented on both cloud and on-premise contexts. Thus, same applications can be used by customers in different implementation scenarios.

In system landscape 300, one or more users 305 (e.g., developers, system administrators, end users, etc.) operate on one or more client systems 320. Users 305 may request different services or execute various operations available within client systems 320. The requested services could be provided by one or more server systems 330 via network 310. The illustrated one or more server systems 330 may represent one or more backend nodes or application servers in the computer system landscape 300, e.g., clustered or not. In the context of SAP SE system landscape, application server 330 could be HANA XS application server, providing a platform for running applications accessing HANA in-memory database (HANA DB®), e.g., database 365. Users (305) can access the functionality of the applications running on application server 330 via browser 325, for example. Alternatively, dedicated client applications running on client system 320 may be utilized (e.g., various mobile apps). In one embodiment, a WebIDE could be provided at client system 320, e.g., through browser based UI client 325.

Application server 330 could be based on micro services architecture (e.g. SAP HANA Extended Application Services (SAP HANA XS)), and oriented towards hosting cloud-type applications. For example, the application server 330 could implement runtime platform 360 as a cloud-based computing platform, such as Cloud Foundry. In one embodiment, runtime platform 360 is an on-premise solution built upon Cloud Foundry open-source cloud platform (e.g., SAP HANA XS runtime platform), to provide various frameworks to deploy cloud-based application services on-premise, as well as on cloud. As illustrated in FIG. 3, runtime platform 360 may support multiple runtimes, e.g., deployable at multiple dedicated containers, such as Java® server application runtime 344 deployed in application container 340. Similarly, application containers 350 and 355 may be instantiated to deploy runtimes based on different technologies, like Node.js technology, Ruby® technology, etc.

Various applications may be instantiated and run simultaneously, together or independently, on one or more of the supported runtimes, in dedicated containers (340, 350, 355), to provide a number of application services at server system 330. In the common scenario, a user (305) accesses an application user interface, e.g., in a browser (325) at a client system (320) to request a particular service. The submitted service request is provided at an application server (server system 330). e.g., via a public or a private network (310), where a router, such as application router 335, identifies an application instance that could handle the request and calls the application at the corresponding container (340, 350, or 355) in a runtime platform (360) for processing. In one embodiment, application router (e.g., 335) may be a routing service that dispatches client requests to specific application instances based on predefined routing. For example, a host names assigned to the application instances may be used to route requests.

The application requests routed to a particular application instance for processing may be further divided based on type. For example, the requests forward at a specific container (e.g., container 340) could include regular business oriented application requests, as well as special requests. To handle properly the different types of requests, instead of forwarding them directly to the application runtime (344), they are intercepted by a proxy (e.g., deployment proxy 342), according to one embodiment. The proxy may run as a separate process in the container, independently from the runtime. The proxy may pass the regular requests to the runtime for execution by the application instance, and may directly process the special requests. Such direct processing may allow performing of various actions independent from the runtime, including direct manipulation of data stored in the local file system of the container (346), setup of runtime variables, restarting the application runtime (e.g., to refresh cached data), etc.

For example, from development perspective, handling special requests by introducing a generic proxy on application container level may enable accelerated deployment cycles, e.g., within seconds instead of minutes. As a result, developers have the flexibility to apply incremental development techniques more efficiently, independent from the development technology, which could be a key success factor that can translate to different other benefits, including marketing advantage.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java®, C++®, or other object-oriented programming language and development tools. Another embodiment may be implemented in hard-wired circuitry in place of, or in combination with machine readable software instructions.

Figure 4:
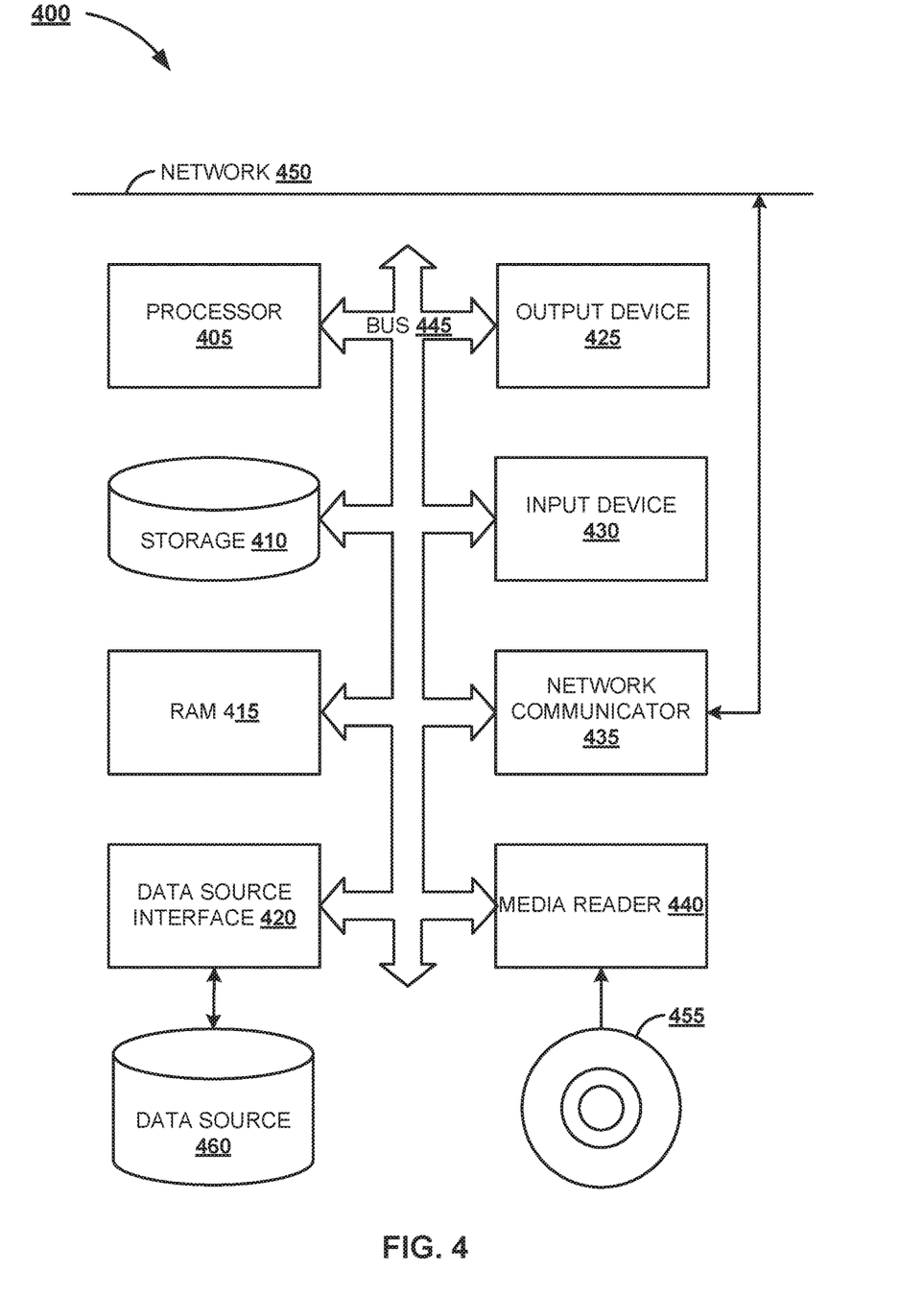
FIG. 4 is a block diagram of an exemplary computer system to execute special requests at dedicated application containers, according to one embodiment.

FIG. 4 is a block diagram of an exemplary computer system 400. The computer system 400 includes a processor 405 that executes software instructions or code stored on a computer readable storage medium 455 to perform the above-illustrated methods. The computer system 400 includes a media reader 440 to read the instructions from the computer readable storage medium 455 and store the instructions in storage 410 or in random access memory (RAM) 415. The storage 410 provides a large space for keeping static data where at least some instructions could be stored for later execution. The stored instructions may be further compiled to generate other representations of the instructions and dynamically stored in the RAM 415. The processor 405 reads instructions from the RAM 415 and performs actions as instructed. According to one embodiment, the computer system 400 further includes an output device 425 (e.g., a display) to provide at least some of the results of the execution as output including, but not limited to, visual information to users and an input device 430 to provide a user or another device with means for entering data and/or otherwise interact with the computer system 400. Each of these output devices 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, servers, data stores, and interfaces, for instance. The modules of the computer system 400 are interconnected via a bus 445. Computer system 400 includes a data source interface 420 to access data source 460. The data source 460 can be accessed via one or more abstraction layers implemented in hardware or software. For example, the data source 460 may be accessed via network 450. In some embodiments the data source 460 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the presented embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limiting to the precise forms disclosed. While specific embodiments and examples are described herein for illustrative purposes, various equivalent modifications are possible, as those skilled in the relevant art will recognize. These modifications can be made in light of the above detailed description. Rather, the scope of the specification is to be determined by the following claims, which are to be interpreted in accordance with established doctrines of claim construction.

What is claimed is:

1. A computer system to process special requests at dedicated application containers, the system comprising:
a memory to store computer executable instructions; and
a processor to execute the instructions stored in the memory to:
store, locally to a local file system of a dedicated container, artifacts of an application together with artifacts of an application runtime environment, wherein the application runtime environment to host an instance of the application;
deploy the application runtime environment and the instance of the application at the dedicated container, wherein the dedicated container provides a single end point to the instance of the application;
start a proxy at the dedicated container, in parallel to the application runtime environment;
intercept, by the proxy, an application request routed to the single end point, wherein the single end point provides direct access to the local file system of the dedicate container;
identify, by the proxy, whether the application request is special request; and
when the application request is determined as special request, process the application request by the proxy, separate from the application runtime environment, wherein processing the application requests includes:
accessing the local file system of the dedicated container, and
directly applying a change defined with the application request on a deployed application artifact without re-executing a full deployment cycle.

2. The system of claim 1, wherein the processor to execute the instructions stored in the memory further to:
intercept, by the proxy, a second application request routed to the single end point;
identify the second application request as regular application request; and
forward the second application request to the application runtime environment for processing by the instance of the application.

3. The system of claim 1, wherein starting the proxy comprises:
deploying the proxy at the dedicated container to run as an independent process.

4. The system of claim 1, wherein starting the proxy comprises:
deploying the proxy embedded in the application runtime environment.

5. The system of claim 1, wherein identifying the application request as special request comprises:
verifying that the application request includes an action specifying at least one of changing an artifact of the application, altering an environment variable of the dedicated container, and restarting the application runtime environment.

6. The system of claim 1, wherein identifying whether the application request is special request comprises:
recognizing the application request as special application request based on a parameter included in a routing string associated with the application request.

7. A non-transitory computer-readable medium to store instructions, which when executed by a computer, cause the computer to perform operations comprising:
deploy the instance of a cloud application at a cloud-based container, wherein the instance of the cloud application is deployed in an application runtime environment executing at the cloud-based container, and wherein the cloud-based container provides a single end point to the instance of the cloud application, and wherein artifacts of the cloud application together with artifacts of the application runtime environment are packaged together at a local file system of the cloud-based container, and wherein the single end point provides direct access to the local file system of the cloud-based container;
start a hot deployment proxy at the cloud-based container, in parallel to the executing application runtime environment;
intercept, by the hot deployment proxy, an application request routed to the single end point;
identify, by the hot deployment proxy, whether the application request is hot deployment request; and
when the application request is determined as hot deployment request, process the application request by the hot deployment proxy, separate from the application runtime environment, wherein processing the application requests includes:
accessing the local file system of the cloud-based container; and
directly applying a change defined with the application request on relevant deployed artifacts without re-executing a full deployment cycle.

8. The non-transitory computer-readable medium of claim 7 to store instructions, which when executed by the computer, cause the computer to perform operations further comprising:
intercept, by the hot deployment proxy, a second application request routed to the single end point;
identify the second application request as operation request; and
pass the second application request to the application runtime environment for processing by the instance of the cloud application.

9. The non-transitory computer-readable medium of claim 7, wherein deploying the instance of the cloud application comprises:
deploying the application runtime environment at the cloud-based container to host the instance of the cloud application.

10. The non-transitory computer-readable medium of claim 7, wherein starting the hot deployment proxy comprises:
deploying the hot deployment proxy at the cloud-based container to run as an independent process.

11. The non-transitory computer-readable medium of claim 7, wherein starting the hot deployment proxy comprises:
deploying the hot deployment proxy at the cloud-based container as a process embedded in the application runtime environment.

12. The non-transitory computer-readable medium of claim 7, wherein identifying whether the application request is hot deployment request comprises:

verifying that the application request includes an action specifying at least one of changing an artifact local to the cloud-based container, altering an environment variable of the cloud-based container, and restarting the application runtime environment.

13. The non-transitory computer-readable medium of claim 7, wherein identifying whether the application request is hot deployment request comprises:

recognizing the application request as hot deployment request based on a parameter included in a routing string associated with the application request.

14. A computer implemented method to process special requests at dedicated application containers, the method comprising:

instantiating a dedicated container to host an instance of a selected application;

deploying the instance of the application at the dedicated container, wherein the instance of the application is deployed in an application runtime environment executing at the dedicated container, and wherein the dedicated container provides a single end point to the instance of the application;

storing, locally to a local file system of the dedicated container, artifacts of the selected application together with artifacts of the application runtime environment, wherein the application runtime environment to host an instance of the selected application;

starting a proxy process at the dedicated container, in parallel to the executing application runtime environment;

intercepting, by the proxy process, an application request routed to the single end point, wherein the single end point provides direct access to the local file system of the dedicate container;

identifying, by the proxy, whether the application request is special application request; and when the application request is determined as special application request, processing the application request by the proxy process, separate from the application runtime environment, wherein processing the application requests includes:

accessing the local file system of the dedicated container; and directly applying a change defined with the application request on deployed application artifacts without re-executing a full deployment cycle.

15. The method of claim 14, further comprising:

intercepting, by the proxy process, a second application request routed to the single end point;

identifying the second application request as regular application request; and passing the second application request to the application runtime environment for processing by the instance of the application.

16. The method of claim 14, wherein deploying the instance of the application comprises:

deploying the application runtime environment at the dedicated container to host the instance of the application.

17. The method of claim 14, wherein starting the proxy process comprises:

deploying the proxy process at the dedicated container as an independent service.

18. The method of claim 14, wherein starting the proxy process comprises:

deploying the proxy process at the dedicated container as a service embedded in the application runtime environment.

19. The method of claim 14, wherein identifying whether the application request is special application request comprises:

verifying that the application request includes an action specifying at least one of changing data local to the dedicated container, altering an environment variable of the dedicated container, and restarting the application runtime environment.

20. The method of claim 14, wherein identifying whether the application request is s special application request comprises:

recognizing the application request as special application request based on a parameter included in a routing string associated with the application request.

* * * * *